United States Patent [19]
Corpora et al.

[11] Patent Number: 5,171,519
[45] Date of Patent: Dec. 15, 1992

[54] OUTSIDE OF CONTAINMENT CHEMICAL DECONTAMINATION SYSTEM FOR NUCLEAR REACTOR PRIMARY SYSTEMS

[75] Inventors: Gary J. Corpora, Monroeville; Frank I. Bauer, Perry Township, Lawrence County; Gordon A. Israelson, Murrysville; Lawrence B. Shaffer, Jr., Unity Township, Westmoreland County, all of Pa.

[73] Assignee: Westinghouse Electric Corp., Pittsburgh, Pa.

[21] Appl. No.: 630,049

[22] Filed: Dec. 19, 1990

[51] Int. Cl.$^5$ .............................. G21F 9/00
[52] U.S. Cl. .................. 376/310; 376/313; 210/251; 210/257.1; 210/284
[58] Field of Search .......... 376/310, 313, 316; 210/284, 257.1, 251

[56] References Cited

U.S. PATENT DOCUMENTS

| | | | |
|---|---|---|---|
| 3,205,144 | 9/1965 | Jabsen | 176/50 |
| 3,520,805 | 7/1970 | Ryan | 210/32 |
| 3,651,942 | 3/1972 | Berardi | 210/140 |
| 3,805,959 | 4/1974 | Mertens | 210/170 |
| 3,962,078 | 6/1976 | Hirs | 210/27 |
| 3,976,541 | 8/1976 | Stiteler et al. | 176/37 |
| 4,043,865 | 8/1977 | Kausz et al. | 176/37 |
| 4,444,680 | 4/1984 | Kitzes et al. | 252/632 |
| 4,731,124 | 3/1988 | Bradbury et al. | 134/3 |

FOREIGN PATENT DOCUMENTS

| | | | |
|---|---|---|---|
| 1169167 | 6/1984 | Canada | 210/251 |
| 0255015 | 2/1988 | European Pat. Off. | 376/313 |
| 0100978 | 8/1979 | Japan | 376/313 |
| 3103999 | 5/1988 | Japan | 376/313 |

*Primary Examiner*—Donald P. Walsh
*Assistant Examiner*—Chrisman D. Carroll
*Attorney, Agent, or Firm*—J. C. Valentine

[57] ABSTRACT

A nuclear reactor having a chemical decontamination system is provided in which every piece of decontamination equipment which processes radioactive materials is located within a decontamination building. The decontamination system is designed to provide for adequate protection for personnel safety and also incorporates a modular design for equipment transportation and storage.

21 Claims, 5 Drawing Sheets

OUTSIDE OF CONTAINMENT CHEMICAL DECONTAMINATION SYSTEM FOR NUCLEAR REACTOR PRIMARY SYSTEMS

BACKGROUND OF THE INVENT

1. Field Of The Invention

The present invention relates to the field of decontamination of nuclear reactor primary systems. More specifically, it relates to a unique apparatus for integrating a chemical injection system, a clean-up subsystem and a resin replacement system into a nuclear reactor primary system for chemical decontamination of the entire primary system in which the process equipment is located outside of the containment chamber.

1. Description Of The Prior Art

The problem of excessive personnel exposures caused by high background radiation levels in a nuclear reactor primary system, such as in pressurized water reactor (PWR) systems, and the resultant economic cost of requiring personnel rotation to minimize individual exposure is significant at many nuclear plants. These background levels are principally due to the buildup of deposits of radioactive corrosion products in certain areas of the plant. The buildup of corrosion products exposes workers to high radiation levels during routine maintenance and refueling outages. The long term prognosis is that personnel exposure levels will continue to increase.

As a nuclear power plant operates, the surfaces in the core and primary system corrode. Corrosion products, referred to as crud, are activated during transport of the corroded material through the core region by the reactor coolant system (RCS). Subsequent deposition of the activated crud elsewhere in the system produces radiation fields in piping and components throughout the primary system, thus increasing radiation levels throughout the plant. The activity of the corrosion product deposits is predominately due to Cobalt 58 and Cobalt 60. It is estimated that 80–90% of personnel radiation exposure can be attributed to these elements.

One way of controlling worker exposure, and of dealing with this problematic situation, is to periodically decontaminate the nuclear steam supply system using chemicals which remove a significant fraction of the corrosion product oxide films. Prior techniques had done very little to decontaminate the primary system as a whole, typically focusing only on the heat exchanger (steam generator) channel heads.

Two different chemical processes, referred to as LOMI (developed in England under a joint program by EPRI and the Central Electricity Generating Board) and CANDEREM (developed by Atomic Energy of Canada, Ltd.), have been used for small scale decontamination in the past. These processes are multi-step operations, in which various chemicals are injected, recirculated, and then removed by ion-exchange. Although the chemicals are designed to dissolve the corrosion products, some particulates are also generated. One method of chemical decontamination, focusing on the chemistry of decontamination, is disclosed in U.K. Patent Application No. GB 2 085 215 A (Bradbury et al.). There is little disclosure, however, of the methodology t be used in applying that chemistry to system decontamination.

While these chemical processes had typically been used on only a localized basis, use of these chemical processes has now been considered for possible application on a large scale, i.e. full system chemical decontamination. Such an application is disclosed generally in co-pending Application Ser. No. 07/621,120, filed Nov. 26, 1990, now U.S. Pat. No. 5,089,216, entitled "System For Chemical Decontamination Of Nuclear Reactor Primary Systems", and incorporated herein by reference.

While some work has been done in the boiling water reactor (BWR) programs, the BWR scenarios examined by those in the field involved decontaminating fuel assemblies in sipping cans employing commercial processes at off-normal decontamination process conditions with little regard for the effects of temperature, pressure, and flow that would be mandated by an actual application of the process to the full RCS.

The estimated collective radiation dose savings over a 10-year period following decontamination is on the order of 3500–4500 man rem, depending upon whether or not the fuel is removed during decontamination. At any reasonable assigning of cost per man-rem, the savings resulting from reduced dose levels will be in the tens of millions of dollars.

As a result of the present examination of potential full system decontamination, and the resulting need for new sub-system methods, developments have been made by the assignor of this invention to use demineralizing resin beds in conjunction with the known chemical processes. Developments in resin replacement systems for the demineralizer resin beds have also been made by the assignor of this invention. These developments are set forth in co-pending Application Ser. No. 07/621,129, filed Nov. 26, 1990, now U.S. Pat. No. 5,089,217 entitled "Clean-up Sub-system for Chemical Decontamination of Nuclear Reactor Primary systems", and in Ser. No. 07/621,130, filed Nov. 26, 1990 entitled "Resin Processing System, which are both incorporated herein by reference.

There exists a need for a design layout which incorporates these advanced full system decontamination systems and sub-systems and incorporates them into an existing or future reactor plant design. One such plant design would be an "outside of containment" design in which the plant processing units which constitute the chemical decontamination process would be installed outside of the containment chamber.

SUMMARY OF THE INVENTION

The present invention is directed to a chemical decontamination system to be used in conjunction with a nuclear reactor primary system to achieve full primary system decontamination. More specifically, the present invention is directed towards an "outside of containment" chemical decontamination system which locates the chemical decontamination equipment outside of the containment chamber. The present invention provides for locating the equipment systems necessary for the chemical decontamination process on modular skids which can be easily installed in a decontamination building when needed and easily removed from that building when not in use. The decontamination process equipment is primarily comprised of a demineralizer system, a resin fines filter system, and a spent resin storage system.

The demineralizer system is comprised of a plurality of demineralizer vessels which are downstream of and flow coupled to the primary system. The resin fines filter system is comprised of a plurality of resin fines filters which are downstream of and flow coupled to the demineralizer vessels.

The spent resin storage tank system is comprised of a plurality of spent resin storage tanks which are downstream of and flow coupled to said demineralizer vessels and which receive spent resin from the demineralizer vessels.

It is an object of the present invention to provide a process design which allows for the connection of a chemical decontamination system into a nuclear reactor primary system to economically and chemically decontaminate substantially the entirety of the nuclear reactor primary system in which the decontamination system equipment is located within a decontamination building outside of the containment chamber. This and other aspects of the present invention are more fully appreciated from the detailed description of the invention.

DETAILED DESCRIPTION OF THE INVENTION

Certain aspects of the use of a full system chemical decontamination process to clean the primary reactor fluid system of radioactive "crud" is disclosed in co-pending Application Ser. No. 07/621,120, filed Nov. 26, 1990, now U.S. Pat. No. 5,089,216, entitled "System for Chemical Nuclear Reactor Primary Systems," Application Ser. No. 07/621,129, filed Nov. 26, 1990, now U.S. Pat. No. 5,089,217, entitled "Clean-up Subsystem for Chemical Decontamination of Nuclear Reactor Primary System," and Application Ser. No. 07/621,130, filed Nov. 26, 1990, entitled "Resin Processing System," all of which are incorporated herein by reference.

The designing of such a system to allow for the installation of the decontamination equipment outside of the containment chamber is necessary for certain nuclear plants. The containment chamber is a heavily shielded area which encompasses the critical nuclear reactor equipment which handles radioactive materials, such as the reactor vessel, the primary process fluid system and the steam generation equipment. An "outside of containment" configuration has several advantages over an "inside-of-containment" configuration. The "inside-of-containment" configuration is defined as having all of the decontamination equipment which handles radioactive material inside of the containment chamber. First, all of the decontamination equipment set-up and shielding fabrication is performed off critical path. This means that the reactor does not have to be shut-down while the decontamination equipment is being installed or disassembled, thus reducing costs. Second, the spent resin handling operations are performed off critical path and thus costs are reduced. Third, equipment size and shielding are not limited by the size of the equipment hatch, thus allowing for a more flexible design.

It has been found that the optimum interface between the chemical decontamination system and the primary reactor coolant system is via the residual heat removal (RHR) system. This is further detailed in a co-pending application Ser. No. 07/621,120, filed Nov. 26, 1990, now U.S. Pat. No. 5,089,216, entitled "System for Chemical Decontamination of Nuclear Reactor Primary Systems," and incorporated herein by reference.

The connection between an outside of containment decontamination system and the primary reactor coolant system is preferably made at a point outside of the containment chamber. In this way, no new lines must be established through the containment chamber. Most plants contain a part of the RHR system outside of the containment chamber, or a line from the RHR system coming out of the containment chamber, and therefore that system is an ideal system to gain access to the primary reactor coolant system.

In the preferred embodiment, the connection between the decontamination system inlet and the decontamination outlet are on the same RHR system line. The inlet decontamination connection is made upstream from the outlet decontamination connection. Placed between the inlet connection and the outlet connection is a flow regulation valve which directs the primary process fluid from the RHR system to the decontamination system.

If a connection to the primary reactor coolant system cannot be made effectively outside of the containment chamber, then new lines must be established between the decontamination system and the primary reactor coolant system through the containment wall. One preferred access way would be to use the equipment hatch as a piping route. In this way, when the decontamination is complete, the piping can be removed and thus a permanent new line penetration through containment is avoided. In this connection design, the decontamination system connection must be made on the critical path and therefore during a reactor shut-down.

The process piping between the RHR system and the decontamination system may be long, thus requiring precautions against the unlikely event of leakage. Therefore, the piping is preferably provided with safety features. These safety features may include a secondary envelope medium around the piping lines, such as double wall piping, trenches, curbs, sumps, or encasement in concrete.

Certain aspects of the equipment utilized in the full system chemical decontamination process and the flow connections between these systems are set forth in co-pending application Ser. No. 07;621,129 filed Nov. 26, 1990, now U.S. Pat. No. 5,089,217, entitled "Clean Up Subsystem for Chemical Decontamination of Nuclear Reactor Primary Systems," and Application Ser. No. 07/621,130, filed Nov. 26, 1990 entitled "Resin Processing System," and both of these are incorporated herein by reference. However, since the entire decontamination system is not discussed in either of those two applications, the entire system will be set forth hereinafter.

The preferred embodiment of the entire system decontamination process as described hereinafter is sized to operate within a "four-loop" reactor. Such a reactor has four reactor coolant system steam generation units. The same process may be employed for smaller plants utilizing "two-loop" and "three-loop" designs. The smaller plant designs would employ a smaller equipment design which would be roughly proportional to the reduction in wetted surface area compared to the "four-loop" design.

Figure 1:
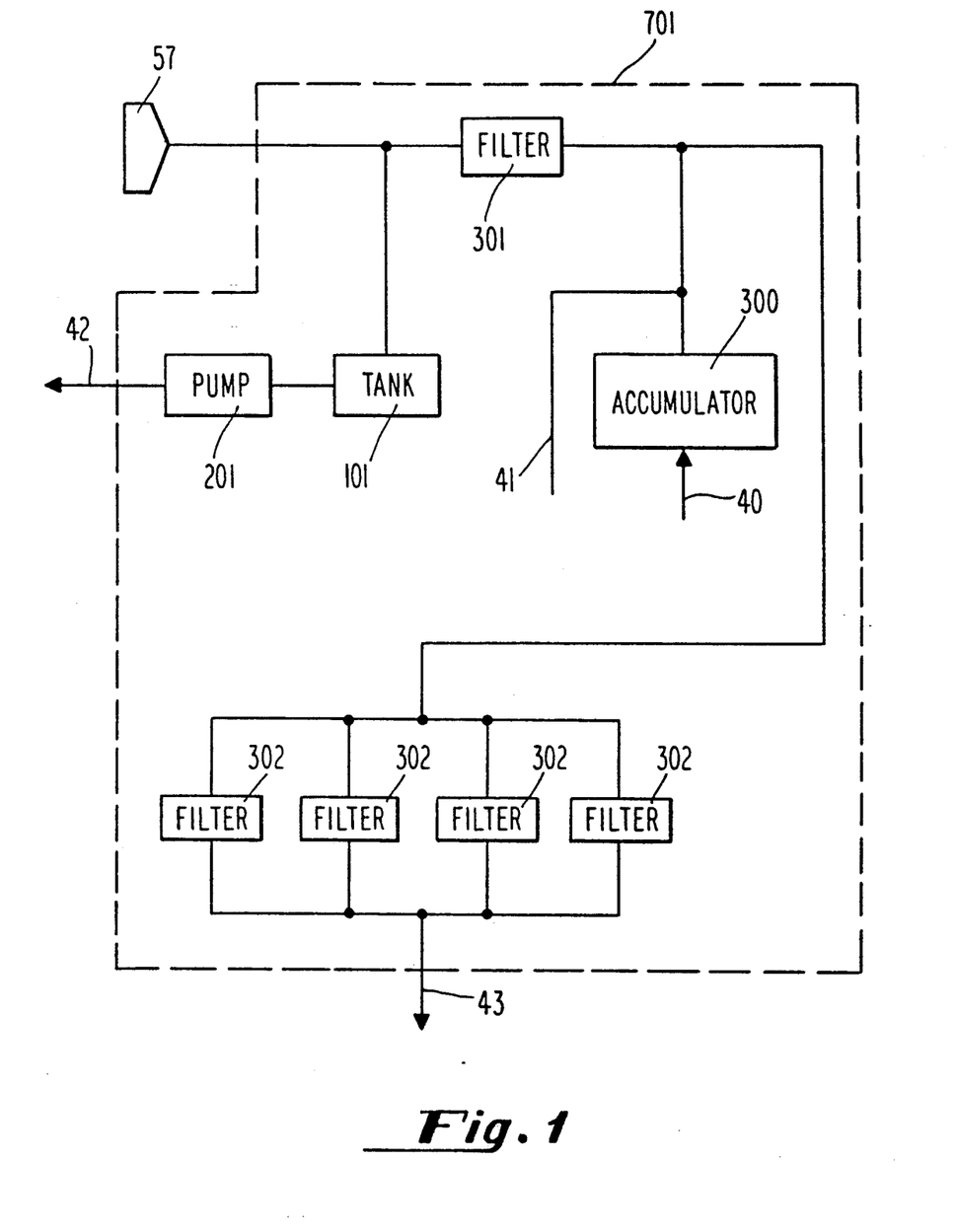
FIG. 1 is a schematic process flow diagram illustrating the optional pre-demineralizer filtering process of the chemical decontamination system.

Referring now to FIG. 1, process fluids from the primary system are sent via line 57 to an optional back-flush filter system 701. The back-flush filter system 701 is provided to filter suspended solids found in the primary system which are removed from the primary system during the decontamination. This system also removes manganese dioxide colloids or particles which are generated during the known CAN-DEREM and LOMI techniques. Certain chemical decontamination processes may not generate suspended solids in the primary process fluids. Therefore, the utilization of the back-flush filter system 701 is considered to be optional.

The process fluids first enter a back-flush filter 301. This back-flush filter 301 can be periodically back-flushed by use of accumulator 300 which has an inlet nitrogen line 40 connected thereto. Also, line 41 provides demineralized water to aid in the back-flushing of the back-flush filter 301. When a back-flush step is in process the back-flushed material will be collected into filtrate collection tank 101 and can be pumped via filtrate transfer pump 201 along line 42 to any of the spent resin storage tanks 121 shown on FIG. 4. After exiting the back-flush filter 301 the process fluids enter the post filters 302.

The back-flush filter 301 is preferably sized to handle the full flow rate of the decontamination system; in this case about 1500 gallons per minute (gpm), and has a 5-20 micron filter. The accumulator 300 is preferably sized to have a capacity sufficient to perform a complete backflush, in this case about 30 gallons. The filtrate collection tank 101 is preferably sized to have a capacity of several backflush volumes; arbitrarily set at about 400 gallons and the filtrate collection pump 201 is preferably sized to empty the filtrate collection tank 101 in less than an hour with a capacity of about 10-50 gpm. The post filters 302 are designed to operate in parallel and preferably have a combined flow rate equal to the backflush filter 301 of about 1500 gpm. Most preferably, four such filters are employed, each having a capacity of about 375 gpm and having about a 1 micron filter rating. Any type of filtering equipment may be used to constitute the backflush filter system 701. This system is not limited to a back-flush filter and other embodiments may include the use of cartridge filters with or without the use of a preliminary back-flush filter.

Figure 2:
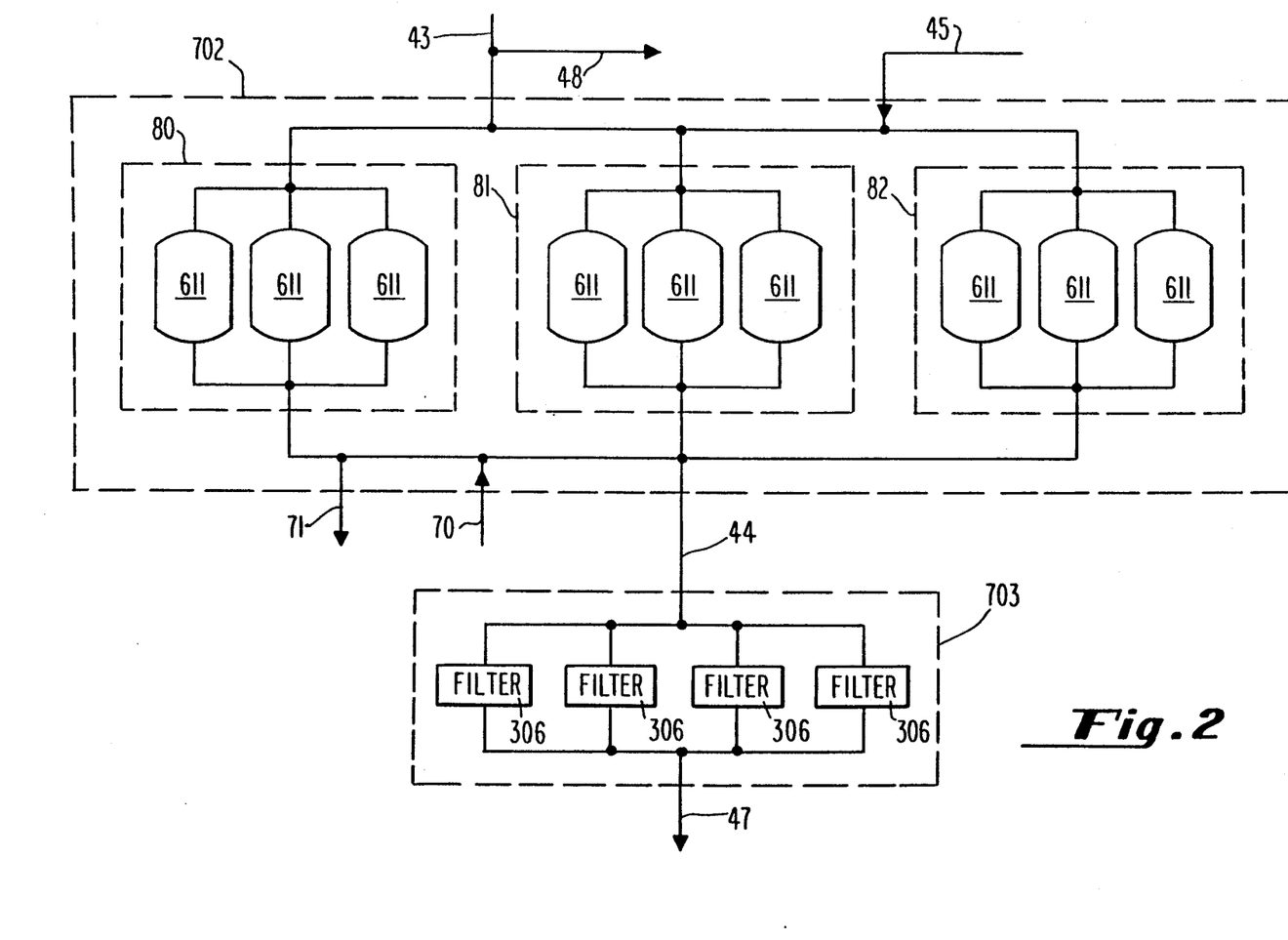
FIG. 2 is a schematic process flow diagram illustrating the demineralizer and post filtering processes of the chemical decontamination system.

After exiting the post filters 302 the process fluid travels through line 43, and now referring to FIG. 2, enters the demineralizer system 702. The demineralizer system 702 is provided to remove the chemicals which are added during the chemical decontamination process and radioactive corrosion products. This system is shown as being comprised of demineralizers 80, 81, and 82. Preferably, at least two demineralizers are employed, however, more than two demineralizers may be used. In the preferred embodiment, demineralizer 82 is a Regen demineralizer and has a total volume of about 400 ft.$^3$ (11.3 m$^3$). Most preferably this Regen demineralizer contains three demineralizer vessels 611 which each have a volume of about 133 ft.$^3$ (3.8 m$^3$). In the preferred embodiment two other demineralizers 80, 81 are also employed and each have a volume capacity of 600 ft$^3$ (17.0 m$^3$). Most preferably the demineralizers 80, 81 each contain three demineralizer vessels 611 which each have a volume of about 200 ft.$^3$ (5.7 m$^3$). The amount of ion exchange resin used for decontamination is determined by the amount of deposits which have been produced in the RCS system. A small amount of deposits in a RCS would require less resin than that required for a heavily contaminated RCS facility.

The demineralizers 80, 81, 82 are flow coupled to line 45 which is used to supply fresh resin to the demineralizer system 702. Line 70 is also provided for the introduction of sluice water to the demineralizer system 702 in a counter flow fashion to be used to flush spent resin out of the demineralizer vessels. The spent resin exits the demineralizer system 702 via line 71. The process fluid can also be diverted around the demineralizer system 702 via line 48.

After the process fluids exit the demineralizer system 702 they are transported via line 44 to the resin fines filter system 703. The resin fines filter system 703 is provided to ensure that any resin from the demineralizer system 702 does not enter the primary system. The resin fines filter system 703 preferably contains a plurality of filters which have a combined total flow rate capacity equal to the decontamination system flow of about 1,500 gpm. In the preferred embodiment, four resin fines filters 306 are utilized. Each resin fines filter 306 has a capacity of 375 gpm and a filter rating of about 25 micron.

Figure 3:
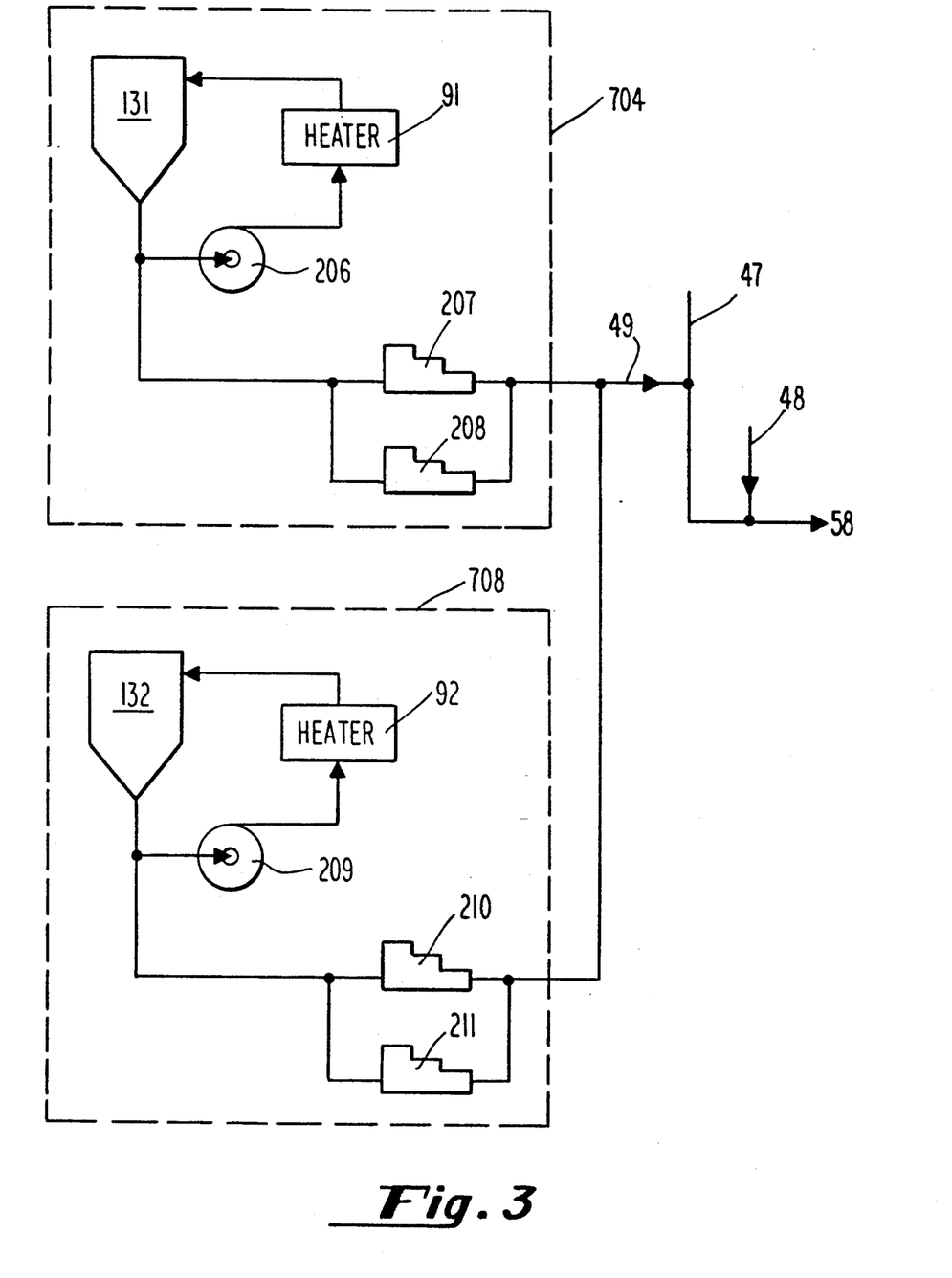
FIG. 3 is a schematic process flow diagram of the chemical injection system of the chemical decontamination system.

After exiting the resin fines filter system 703 the process fluid is transported via line 47, and referring to FIG. 3, back to the primary system via line 58.

Prior to the entry back into the primary system, chemicals are injected into the processed fluids. In the preferred embodiment, two chemical injection systems are utilized. First is a vanadous formate system 704. This vanadous formate system 704, in the preferred embodiment, has a vanadous formate tank 131 which contains the vanadous formate compounds in solution. The vanadous formate is preferably prepared by use of a recirculation and heater system shown as a vanadous formate mixing pump 206 flow coupled to a vanadous formate heater 91. When the vanadous formate solution is ready to be injected to the process fluids, the vanadous formate injection pumps 207, 208 are activated. This vanadous formate system 704 is utilized when a LOMI decontamination process is required by the decontamination process.

The second chemical injection system is the chemical system 708 which is shown in the preferred embodiment as comprising a chemical mixing tank 132 which also has a recirculation and heater system shown as chemical mixing pump 209 and chemical heater 92 for dissolving decontamination chemicals in solution. When chemicals from the chemical mixing tank 132 are ready to be sent to the process, the chemical injection pumps 210 and 211 are activated. This chemical system 708 is designed to handle those chemicals utilized in a CAN-DEREM process as required by the decontamination process.

In the preferred embodiment, both the vanadous formate 131 and the chemical mixing tank 132 are about 3000 gallons in size. The amount of decontamination chemicals which must be injected is dependent upon the amount of deposits in the RCS. The vanadous formate mixing pump 206 and the chemical mixing pump 209 are both preferably sized for a flow rate of about 100 gallons per minute. The vanadous formate injection pumps 207, 208 and the chemical injection pumps 210, 211 are preferably sized for a flow rate of 50 gallons per minute. The chemical injection system is flow coupled to the line 47 via line 49 for injection of the chemicals into the processed (demineralized and filtered) fluids prior to reentry of those fluids into the primary system via line 58.

Figure 4:
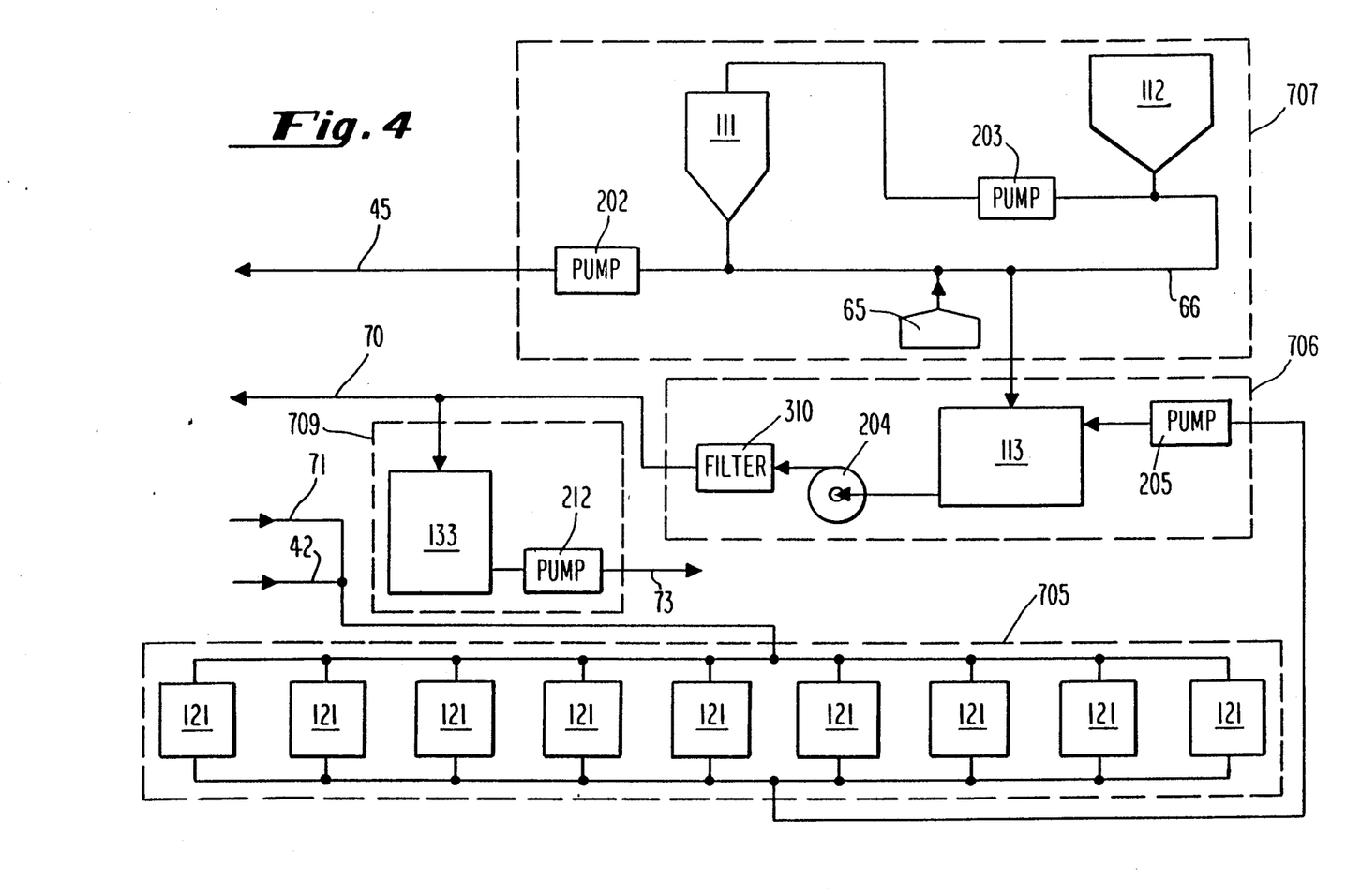
FIG. 4 is a schematic process flow diagram of the resin transport and processing system of the chemical decontamination system.

Referring now to FIG. 4, the new resin system 707 the spent resin storage system 705, the sluice water system 706, and the decontamination waste system 709 are shown. When the ion exchange resin is spent, the demineralizer system 702 has to be regenerated with new resin. The sluice water system 706 is employed to remove the spent resin. Sluice water is provided from the sluice water supply tank 113 to the demineralizer system via line 70. The sluice water travels through the sluice water pump 204 and the sluice water filter 310 prior to entering the demineralizer system 702.

The sluice water system 706 also contains a sluice water recycle pump 205 for recycling the sluice water from the demineralizer system 702. The amount of sluice water required for transport of the resin is dependent upon the amount of resin. The sluice water supply tank is preferably sized to have a capacity of 1,800 gallons of sluice water. The sluice water filter 310 is preferably sized to have a capacity of 100 gpm and the sluice water pump 204 and the sluice recycle pump 205 are preferably designed to have a capacity of about 100 gpm flow rates.

After the sluice water enters the demineralizer system 702 via line 70, the sluice water carries the spent resin from the demineralizer system 702 via line 71 to the spent resin storage system 705. The spent resin storage system 705 is comprised of a series of tanks which preferably have a combined total storage volume of about 34,400 gallons. The spent resin storage tanks 121 are provided with screen bottoms such that the sluice water exits these tanks and is recirculated via the sluice water recirculation pump 205 to the sluice water supply tank 113. Line 42, from the filtrate collection tank 101 is connected to line 71 upstream of the spent resin storage tank system 705.

A new resin system 707 is preferably included in a decontamination process overall system in order to batch fresh resin to the demineralizer system 702. The new resin system 707 is preferably comprised of a resin supply tank 112 which contains fresh resin. This tank is flow coupled to line 66 which carries demineralizer water from demineralizer water source 65. The solution of resin and demineralizer water is sent to the resin batching tank 111 by the resin supply pump 203. A quantity of resin to fill a demineralizer vessel 611 is then transported from the resin batching tank 111 by the resin feed pump 202 via line 45.

In the preferred embodiment, the resin supply tank 112 is capable of storing about 7000 gallons of resin. The resin batching tank 111 is preferably sized to hold about 2100 gallons of solution. The resin feed pump 202 and the resin supply pump 203 are both preferably sized to have a capacity of about 100 gpm.

A decontamination waste system 709 is also provided. This decontamination waste system 709 comprises a decontamination waste tank 133 which preferably has a volume capacity of about 3000 gallons. The decontamination waste tank 133 is flow coupled to line 70. A decontamination waste pump 212 is flow coupled to the decontamination waste tank 133 for pumping the decontamination waste via line 73 to a storage system. The decontamination system 709 is designed to collect waste solutions from any of the group consisting of the backflush filter system 701, the demineralizer system 702, the spent resin storage tank 705, and the sluice water system 706.

After the full system decontamination process was developed, the task of employing such a system outside of the containment chamber had to be met. Various design problems exist in implementing such a design, the most important being: (1) ensuring that the decontamination building can contain a spill if radioactive materials leak from the decontamination equipment; (2) locating the equipment so that it is properly shielded to protect personnel; (3) providing for ease of installation and disassembly of the decontamination equipment into and out of the decontamination building; (4) providing necessary safety equipment around the piping connecting the decontamination building to the RHR system; and (5) providing a modular design which can be easily stored in radioactive containers.

The design layout configuration of the present invention provides for supplying the equipment necessary for the full system decontamination process in divisible units. These units are placed upon skids which are easily transported by tractor trailers to the reactor site. These units are also easily installed and dismantled and taken out of the decontamination building when not in use. Another key design feature was to design each system so that it could fit upon an individual skid, or a plurality of skids which would be situated in close proximity to one another. A further key design feature was the placement of the separate decontamination systems in separate high activity radioactive source shielded rooms. These rooms have an opening passageway of about from 1.5 ft. (0.5 m) to 3 ft. (0.9 m) to allow for personnel access, but which does not significantly affect the shielding protection afforded to the personnel.

The chemical decontamination process on a full scale basis may only be needed two to three times per reactor life. The particular nuclear facility may therefore desire to remove the equipment when not in use. Therefore, a modular design was required which would lend itself to easy equipment set-up and removal.

Figure 5:
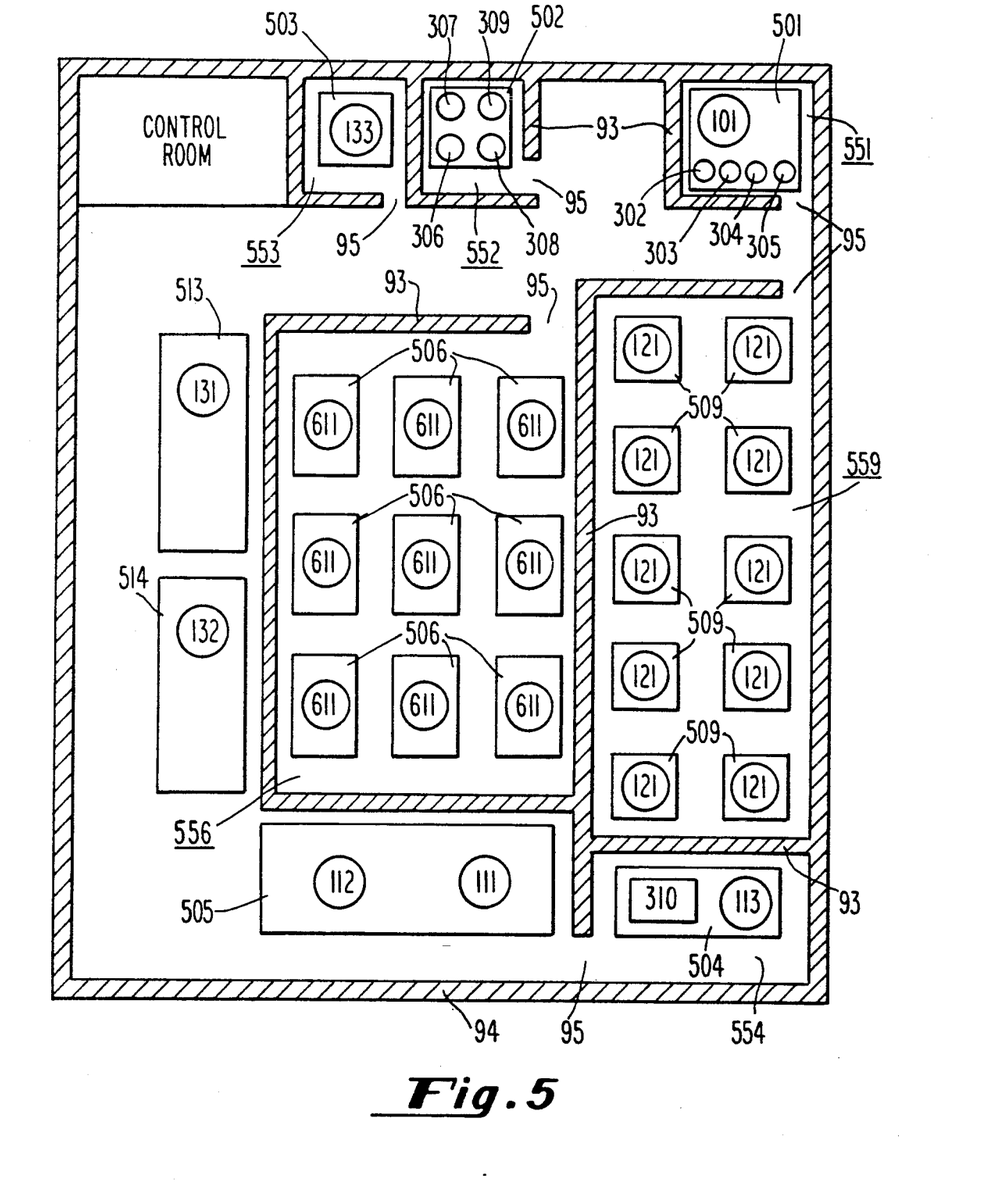
FIG. 5 is a representative schematic equipment layout of the chemical decontamination system used outside of the containment chamber.

Referring now to FIG. 5, a preferred outside of containment layout design is shown for a typical four-loop pressurized water nuclear reactor. In this layout design, skid positions were established for various systems comprising the decontamination system.

The back-flush filter system 701 is positioned on back-flush filter skid 501. The entire back-flush filter system 701 is not shown, however that entire system is preferably placed upon the back-flush filter system skid 501. The back-flush filter system 701 could optionally be placed on a multitude of skids. The entire back-flush filter system 701 is located inside a back-flush filter room 551 defined by the shield 93 and the building wall 94. The exact location of the back-flush filter room 551 is not critical, however the shielding around the back-flush filter system 701 is required. A small access way 95 is provided in order for personnel to maintain the back-flush filter system 701. The width of this access way 95 is about 1.5 ft. (0.5 m) to 3 ft. (0.9 m).

In a preferred embodiment, all of the access ways 95 are of a labyrinth design such that no direct line of sight exists between the process equipment and the personnel. This design permits maximum personnel radiation protection and accessibility for maintenance.

The demineralizer system 702 is shown as a multitude of demineralizer vessels 611 and any combination of such vessels is possible if the total volume capacity is sufficient. In the preferred embodiment each vessel is situated on an individual demineralizer skid 506. This type of layout is preferred for ease in set-up and removal of the equipment. The demineralizer system 702 is also contained within a high radioactivity source shielded room, preferably a separate room, the demineralizer system room 556. This demineralizer system room 556 is also defined by the shield 93. The exact location of the demineralizer system room 556 is not critical, however the shielding of the entire demineralizer system 702 is required. The access way 95 allows for personnel to maintain the demineralizer system 702. It is possible to house each individual demineralizer skid 506 in a separate shielded room, or combine a few vessels, say three vessels, in a separate shielded room. Such a multi-room design for the demineralizer system 702 would allow for the separation of a single, or a battery, of vessels containing high activity radioactive materials or for the separation of leaking vessels while the other vessels could still be operated.

In the preferred embodiment, each demineralizer vessel 611 is placed on an individual skid to allow for storing the vessel in a safety container upon removal of the decontamination system when the system is not in use. The demineralizer skid 506 is designed to fit into a low specific activity (LSA) container for transport and storage. These containers are obtained from manufacturers and currently have a maximum width of 8 ft. (2.4 m) and height of 9 ft. (2.7 m). The maximum length, height, and width is dictated by designing the system to be easily transported on the roadways without requiring a special transportation permit. Therefore, the skids are sized to be about 7.5 ft. (2.3 m) in width and about 9 ft. (2.7 m) in length with the height defined by the vessel. In transporting the vessels in the LSA containment, the skid is placed on its side, if necessary, to fit into the LSA container. The height is preferably kept below 40 ft (12.2 m) to ensure that no special transportation permit is required for these vessels.

The resin fines filter system 703 is positioned on the resin fines filter skid 502. The entire resin fines filter system 703 is not shown, however that entire system is preferably placed upon the resin fines filter system skid 502. The resin fines filter system 703 could optionally be placed on a multitude of skids. The entire resin fines filter system 703 is preferably located inside a resin fines filter room 552 defined by the shield 93 and the building wall 94. The exact location of the resin fines filter room 552 is not critical, however the shielding around the resin fines filter system 703 is required. A small access way 95 is provided in order for personnel to maintain the resin fines filter system 703.

The spent resin storage system 705 is shown as a multitude of spent resin storage tanks 121 and any combination of such tanks is possible if the total volume capacity is sufficient. In the preferred embodiment each tank is situated on an individual spent resin storage system skid 509. This type of layout is preferred for ease in set-up and removal of the equipment. The spent resin storage system 705 is also preferably contained within a separate high radioactivity source shielded room, the spent resin storage room 559. This spent resin storage room 559 is defined by the shield 93 and the building wall 94. The exact location of the spent resin storage room 559 is not critical, however the shielding of the entire spent resin storage system 705 is required. The access way 95 allows for personnel to maintain the spent resin storage system 705. It is possible to house each individual spent resin storage system skid 509 in a separate shielded room, or combine a few tanks, say two tanks, in a separate shielded room. Such a multi-room design for the spent resin storage system 705 would allow for the separation of a single, or a battery, of tanks containing high levels of radioactive materials or for the separation of leaking tanks while the other tanks could still be operated.

In the preferred embodiment, the chemical decontamination equipment is removed when not in use. The spent resin storage tanks 121, as with the demineralizer vessels 611, are therefore stored in LSA containers, which prevent personnel exposure to any radioactive material on the spent resin storage tanks 121. The placement of each spent resin storage tank 121 on a separate spent resin storage system skid 509 is preferred to facilitate this storage process. The spent resin storage system skid 509 was designed with the same skid dimensions of the demineralizer skids 506.

The sluice water system 706 is positioned on the sluice water system skid 504. The entire sluice water system 706 is not shown, however that entire system is preferably placed upon the sluice water system skid 504. The sluice water system 706 could optionally be placed on a multitude of skids. The entire sluice water system 706 is preferably located inside a sluice water system room 554 defined by the shield 93 and the building wall 94. The exact location of the sluice water system room 554 is not critical, however the shielding around the sluice water system 706 is required. A small access way 95 is provided in order for personnel to maintain the sluice water system 706.

The decontamination waste system 709 is positioned on the decontamination waste system skid 503. The entire decontamination waste system 709 is not shown, however that entire system is preferably placed upon the decontamination waste system skid 503. The decontamination waste system 709 could optionally be placed on a multitude of skids. The entire decontamination waste system 709 is preferably located inside a decontamination waste system room 553 defined by the shield 93 and the building wall 94. The exact location of the decontamination waste system room 553 is not critical, however the shielding around the decontamination waste system 709 is required. A small access way 95 is provided in order for personnel to maintain the decontamination waste system 709.

The chemical injection systems are preferably placed within close proximity to the other chemical decontamination systems which handle the radioactive material. In FIG. 6, the vanadous formate system 704 is shown as being located on a vanadous formate skid 513. In the most preferred embodiment, the vanadous formate system 704 is located on one skid, however a multitude of such skids could be utilized. This vanadous formate system 704 does not have to be shielded because no radioactive materials are processed by this system.

The chemical system 708 is shown as being located on a chemical skid 514. In the most preferred embodiment, the chemical system 708 is located on one skid, however a multitude of such skids could be utilized. This chemical system 708 does not have to be shielded because no radioactive materials are processed by this system.

The new resin system 707 is shown as being located on a new resin system skid 505. In the most preferred embodiment, the new resin system 707 is located on one skid, however a multitude of such skids could be utilized. The new resin system 707 does not have to be shielded because no radioactive materials are processed by this system.

The skid dimensions for the back-flush filter system 702, the resin fines filter system 703, the sluice water system 706, and the decontamination waste system 709 are preferably designed to be stored in LSA containers and be transportable without a special road transportation permit. Therefore, the skids are designed to be less than 8 ft. (2.4 m) wide. The height of the equipment on these skids is kept below 9 ft. (2.7 m). The length of the skids is kept below about 40 ft. (12.2 m) in order for the entire skid/LSA container to be transported over the roadway without a special transportation permit.

Various types of shielding walls can be used for the shield 93 and the building wall 94. Typical shielding walls vary from 8 inches (20.3 cm) to 32 inches (81.3 cm) thick solid block walls made of concrete. These walls can also contain a lead additive intermixed with the concrete. These shielding walls are capable of protecting personnel from a high radioactive source such as the equipment which processes the primary process fluids during the chemical decontamination process.

We claim:

1. A nuclear reactor having a chemical decontamination system located inside of a decontamination building for use in cleaning a nuclear reactor primary system containing primary process fluids, the decontamination system comprising:
   (a) demineralizer system located in said decontamination building, said demineralizer system having a plurality of demineralizer vessels flow coupled to said primary system;
   (b) a sluice water system located in said decontamination building and contained within a separate high activity radioactive source shielded room; said sluice water system flow coupled to said demineralizer system, and comprising a sluice water filter flow coupled to said demineralizer system and a sluice water supply tank flow coupled to said sluice water filter;
   (c) a resin fines filter system located in said decontamination building, said resin fines filter system having a plurality of resin fines filters flow coupled to said demineralizer vessels and having exists flow coupled to said primary system; and
   (d) a spent resin storage tank system located in said decontamination building, said spent resin storage tank system having a plurality of spent resin storage tanks flow coupled to said demineralizer vessels.

2. The decontamination system of claim 1 including a filter system located within said decontamination building, and downstream of said primary system and upstream of said demineralizer system.

3. The decontamination system of claim 1 wherein said filter system is contained within a separate high activity radioactive source shielded room.

4. The decontamination system of claim 1, wherein said demineralizer system is contained within a separated high activity radioactive source shielded room.

5. The decontamination system of claim 1, wherein said spent resin storage tank system is contained within a separate high activity radioactive source shielded room.

6. The decontamination system of claim 1, including:
   a containment chamber containing the reactor primary system;
   a decontamination system inlet and a decontamination system outlet;
   a connection line located outside of the containment chamber and containing the primary process fluids;
   a decontamination inlet line connecting the decontamination system inlet to the connection line;
   a decontamination outlet line connecting the decontamination system outlet to the connection line downstream of the decontamination inlet line;
   a valve located on the connection line between the decontamination inlet line and the decontamination outlet line.

7. The decontamination system of claim 1 including a chemical injection system located inside of said decontamination building and flow coupled to said primary system downstream of said resin fines filter system.

8. The decontamination system of claim 7, wherein said chemical injection system includes a vanadous formate system which supplies vanadous formate into said primary process fluids.

9. The decontamination system of claim 1 including a decontamination waste tank system located in said decontamination building within a separate high activity radioactive source shielded room, said decontamination waste tank system having a decontamination waste tank capable of receiving waste solutions from any of the group comprising the demineralizer vessels, and the spent resin storage tanks.

10. A chemical decontamination system, located within a decontamination building, for use in cleaning a nuclear reactor primary system located in a containment chamber and containing primary process fluids, said decontamination system comprising:
   (a) a demineralizer system located in said decontamination building, said demineralizer system containing a plurality of demineralizer vessels located on a plurality of demineralizer skids, and flow coupled to said primary system;
   (b) a resin fines filter system located on a resin fines filter system skid in said decontamination building, said resin fines filter system flow coupled to said demineralizer vessels and having exits flow coupled to said primary system;
   (c) a spent resin storage tank system located in said decontamination building, containing a plurality of spent resin storage tanks arranged on a plurality of spent resin skids, and flow coupled to said demineralizer vessels; and
   (d) a new resin system skid located in said decontamination building containing a new resin batch tank flow coupled to said demineralizer system and a new resin supply tank flow coupled to said new resin batch tank.

11. The decontamination system of claim 10 including a filter system located on a filter system skid in said decontamination building and downstream of the primary system and upstream of the demineralizer system.

12. The decontamination system of claim 10 including a chemical injection system located inside of said decontamination building on a chemical skid and flow coupled to said primary system downstream of said resin fines filter system.

13. The decontamination system of claim 11 wherein said filter system skid is contained within a separate high activity radioactive source shielded room.

14. The decontamination system of claim 10 wherein said plurality of demineralizer skids are contained within a separate high activity radioactive source shielded room.

15. The decontamination system of claim 10 wherein said resin fines filter system skid is contained within a separate high activity radioactive source shielded room.

16. The decontamination system of claim 10 wherein said plurality of spent resin skids are contained within a separate high activity radioactive source shielded room.

17. The decontamination system of claim 11 wherein said filter system skid is dimensioned to fit into a low specific activity container having a maximum width of 8 ft. (2.4 m), height of 9 ft. (2.7 m) and length of 40 ft. (12.2 m)

18. The decontamination system of claim 10 wherein said demineralizer skids are dimensioned to fit into a low specific activity container having a maximum width of 8 ft. (2.4 m), height of 9 ft (2.7 m) and length of 40 ft. (12.2 m).

19. The decontamination system of claim 10 wherein said resin fines filter system skid is dimensioned to fit into a low specific activity container having a maximum width of 8 ft. (2.4 m), height of 9 ft. (2.7 m) and length of 40 ft. (12.2 m).

20. The decontamination system of claim 10 wherein said spent resin skids are dimensioned to fit into a low specific activity container having a maximum width of 8 ft. (2.4 m), height of 9 ft (2.7 m) and length of 40 ft. (12.2 m).

21. A chemical decontamination system, located within a decontamination building, for use in cleaning a nuclear reactor primary system located in a containment chamber and containing primary process fluids, the decontamination system comprising:

(a) a demineralizer system located in said decontamination building, said demineralizer system containing a plurality of demineralizer vessels located on a plurality of demineralizer skids, and flow coupled to said primary system;

(b) a sluice water system located on a sluice water system skid in said decontamination building and flow coupled to said demineralizer system, including:

(i) a sluice water filter flow coupled to said demineralizer system; and (ii) a sluice water supply tank flow coupled to said sluice water filter;

(c) a resin fines filter system located on a resin fines filter system skid in said decontamination building, said resin fines filter system flow coupled to said demineralizer vessels and having exits flow coupled to said primary system; and (d) a spent resin storage tank system located in said decontamination building, containing a plurality of spent resin storage tanks arranged on a plurality of spent resin skids, and flow coupled to said demineralizer vessels.

* * * * *